United States Patent [19]

Rose et al.

[11] Patent Number: 5,356,175
[45] Date of Patent: Oct. 18, 1994

[54] ANTI-RATTLE AND RETENTION STRUCTURE FOR A FLANGELESS INFLATOR OF AN AIRBAG RESTRAINT ASSEMBLY

[75] Inventors: Larry D. Rose, Layton; Donald R. Lauritzen, Hyrum, both of Utah

[73] Assignee: Morton International, Inc., Chicago, Ill.

[21] Appl. No.: 86,928

[22] Filed: Jul. 2, 1993

[51] Int. Cl.$^5$ ............................................. B60R 21/16
[52] U.S. Cl. ............................ 280/728 A; 280/741
[58] Field of Search ......................... 280/728 A, 741

[56] References Cited

U.S. PATENT DOCUMENTS

| | | | |
|---|---|---|---|
| 3,787,010 | 1/1974 | Meranshian et al. | 244/146 |
| 4,153,273 | 5/1979 | Risko | 280/728 A |
| 4,915,410 | 4/1990 | Bachelder | 280/732 |
| 5,033,772 | 7/1991 | Frantom et al. | 280/737 |
| 5,069,480 | 12/1991 | Good | 280/743 |
| 5,096,222 | 3/1992 | Komerska et al. | 280/732 |
| 5,121,941 | 6/1992 | Mihm et al. | 280/732 |
| 5,135,252 | 8/1992 | Suran et al. | 280/732 |
| 5,141,247 | 8/1992 | Barth | 280/728 A |
| 5,149,130 | 9/1992 | Wooley et al. | 280/743 |
| 5,275,431 | 1/1994 | Stephens | 280/728 A |

Primary Examiner—Kenneth R. Rice
Attorney, Agent, or Firm—George W. Rauchfuss; Gerald K. White

[57] ABSTRACT

An inflator, which is shorter than a reaction can of an airbag restraint assembly and which has a flangeless base at one end thereof, is mounted in the reaction can. The mounting structure for the flangeless inflator has a generally circular open cylindrical shape, with its sidewall terminated at a first end in a mounting flange and terminating on the other end thereof in a resilient arm flared radially outward at the end thereof. Preferably, intermediate the mounting flange and the resilient arm is a radially-inwardly-extending integral circumferential rib or discrete dimples. The mounting flange of the mounting structure is located in an opening in an end wall of the reaction can, with the resilient arm frictionally engaging and holding the flangeless base of the inflator in the reaction can while the intermediate rib or discrete dimples prevent any significant rearward axial movement of the inflator in the reaction can thereby providing essentially rattle- and squeak-free retention of the flangeless based inflator in the reaction can in an appropriately positioned and centered manner.

10 Claims, 2 Drawing Sheets

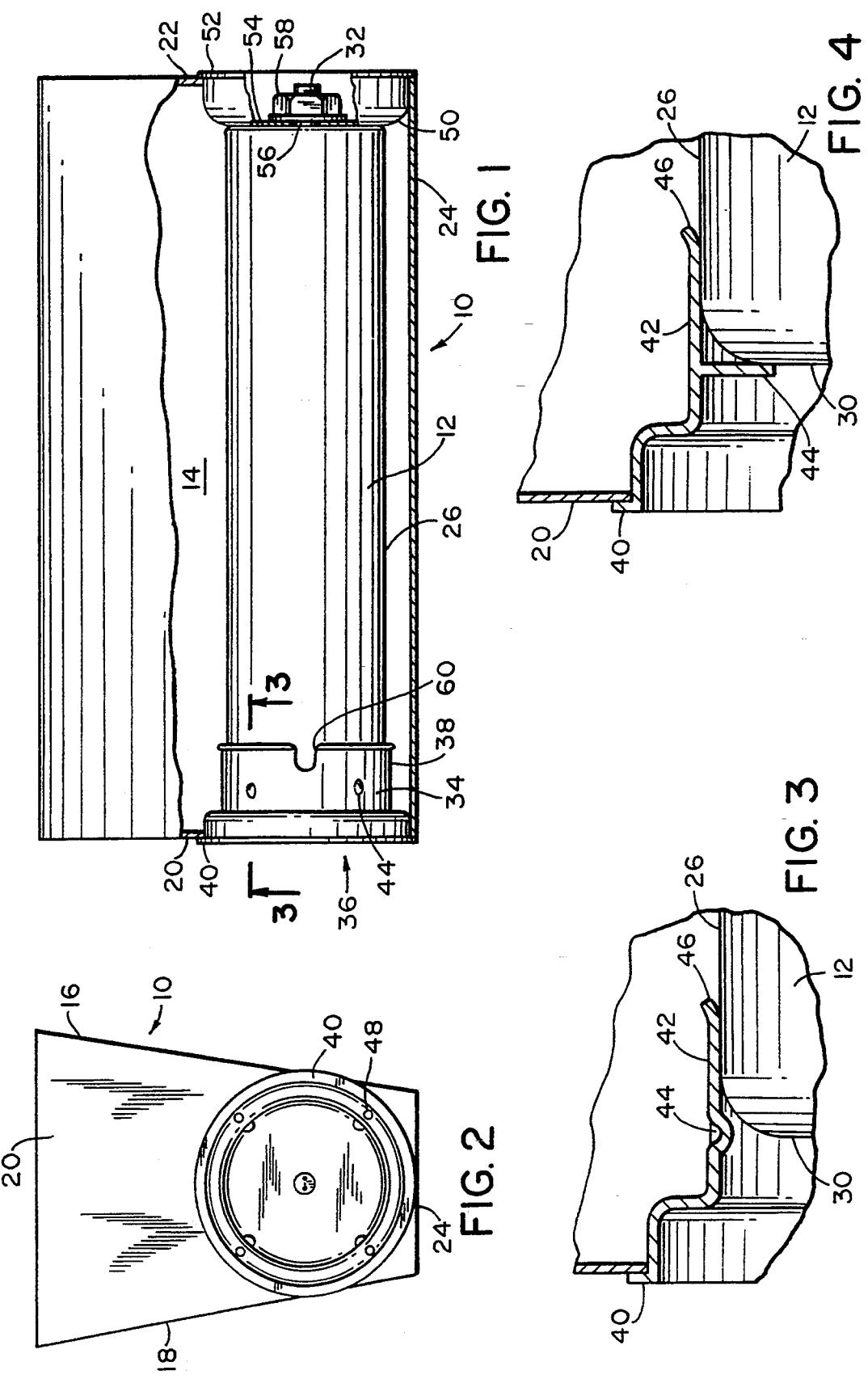

ANTI-RATTLE AND RETENTION STRUCTURE FOR A FLANGELESS INFLATOR OF AN AIRBAG RESTRAINT ASSEMBLY

FIELD OF THE INVENTION

This invention relates to vehicle airbag restraint systems, and more particularly to a mounting structure for mounting a flangeless based (i.e. non-flanged) inflator, which is shorter than a reaction can of an airbag restraint assembly, in the reaction can of such an assembly.

BACKGROUND OF THE INVENTION

A vehicular airbag restraint system generally includes a pyrotechnic inflator which may comprise a cylindrical housing which encloses some form of gas generating material which, when ignited, generates a non-toxic inert gas under pressure within the housing. The inflator, along with an uninflated, folded airbag which is to be inflated by the gas, is disposed in an internal cavity of a reaction can along with means to control deployment. In an emergency situation inert gas is generated in the inflator housing and the gas is directed rapidly through a plurality of nozzles formed in the inflator housing and into the airbag to force the airbag out of the reaction can to inflate the airbag. One location for such a vehicular airbag restraint system is in the instrument panel or dashboard on the passenger side of the vehicle for passive protection of a passenger in the vehicle.

Some inflators are constructed with a flanged base at one end of the cylindrical housing, while other inflators are designed without a flanged base. In either case, packaging and weight limitations may require airbag inflators to be shorter than the reaction cans in which they are housed. This situation requires an inflator to reaction can interface device that is cost effective, durable and squeak- and rattle-free and will center and support the flangeless based end of the inflator without the benefit of a flanged base.

SUMMARY OF THE INVENTION

Accordingly, it is an object of this invention to provide a new and improved mounting structure for mounting a flangeless based (i.e. non-flanged) inflator, which is shorter than a reaction can, in the reaction can of an airbag restraint system which structure produces a mounting interface which will support and center the flangeless end of the inflator without the benefit of a flange and that is squeak and rattle resistant and provides a seal against the escape of gas on deployment of an airbag of the assembly.

Another object of this invention is to provide a new and improved structure for mounting an inflator in a reaction can of a vehicle airbag restraint system which is easy to install, cost effective, and durable as well as squeak- and rattle-free.

In carrying out this invention in one illustrative embodiment thereof, a mounting structure is provided for mounting a non-flanged inflator in a reaction can wherein the inflator is shorter than the reaction can of a airbag restraint system in which the inflator is mounted. The inflator, which is to be positioned in a cavity of a reaction can through an access opening in one end of said reaction can, has a generally cylindrical shape and a flangeless base on a first end thereof, generally the squib end of the inflator. A mounting means is located or positioned in the opening of the reaction can, said mounting means being a generally right circular cylindrical shaped, open tube, the sidewall of which terminates on one end thereof with a circular mounting flange extending radially-outwardly from the sidewall and terminating on the other end thereof in a resilient arm flared radially outward at the end thereof. Intermediate the mounting flange and the resilient arm may be an appropriately positioned radially-inwardly-extending circumferential rib or discrete dimples. The mounting means is located or positioned in the access opening at one end of the reaction can with the mounting flange abutting the exterior side of the reaction can end wall having the access opening. The mounting means extends into the reaction can through the access opening in the reaction can end wall. As installed, the sidewall, intermediate rib or dimples, and resilient arm extend into the cavity in the reaction can. On installation of the inflator, the end of the inflator opposite the flangeless base is mounted in a primary manner to the opposite end wall of the reaction can. The mounting flange of the mounting means is then positioned with the resilient arm frictionally engaging and holding the flangeless base of the inflator in the reaction can while the intermediate rib or dimples restrain any rearward axial movement of the inflator in the reaction can, thereby providing an essentially anti-rattle retention of the flangeless inflator in the reaction can cavity.

BRIEF DESCRIPTION OF THE DRAWINGS

The invention, together with further objects, aspects, features and advantages thereof will be more clearly understood from the following description taken in connection with the accompanying drawings.

FIG. 1 is a front elevational view of a reaction can partly broken away, showing a flangeless inflator mounted therein in accordance with the present invention.

FIG. 2 is a side elevational view of FIG. 1 viewed from the left side of FIG. 1.

FIG. 3 is an enlarged cross-sectional view taken along lines 3—3 of FIG. 1.

FIG. 4 is an enlarged cross-sectional view similar to FIG. 3 of a further embodiment of the invention wherein the intermediate element is an integral rib rather than discrete dimples.

DETAILED DESCRIPTION OF THE INVENTION

Figure 5:
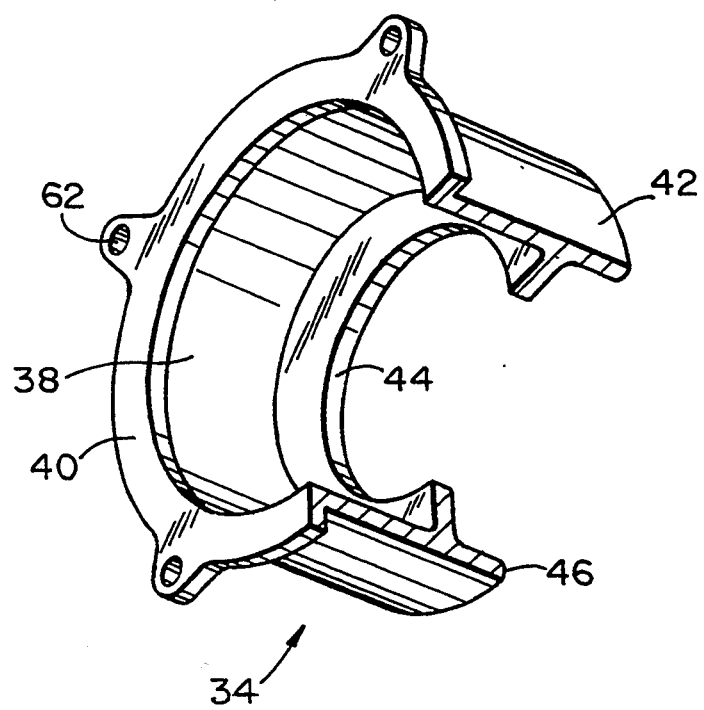
FIG. 5 is a perspective view, partially in section of a further embodiment of a mounting device for use in this invention.

Referring to FIGS. 1 to 4, a reaction can 10 houses an inflator 12 therein along with a folded airbag (not shown) to forman airbag restraint system. The reaction can 10 houses the inflator in an internal cavity 14 formed therein. Reaction can 10 forms cavity 14 by means of sidewalls 16 and 18, generally parallel end walls 20 and 22 and bottom wall 24.

The present invention is directed to mounting the inflator 12 in the reaction can 10 in a manner such that the inflator is retained in the reaction can in an essentially shake- and rattle-free manner despite the fact that the inflator 12 is shorter in length than the length of the reaction can 10.

The inflator 12 includes a generally circular cylindrical housing 26 terminating at a first end in a flangeless base 30 and terminating at the other end in a protruding threaded stud 32. The length of the inflator 12 is less than the distance between the end walls 20 and 22 of reaction can 10.

The inflator is, in part, mounted in cavity 14 of reaction can 10 by mounting device or means 34. Mounting means 34 is an open generally cylindrical, circular tube having an opening or passage 36 therethrough formed by generally right circular cylindrical sidewall 38. The mounting device 34 has, at one end thereof, a cylindrical mounting flange 40 extending radially-outwardly and at the other end a resilient arm 42 flared radially-outwardly at the end 46 thereof. Intermediate, and appropriately spaced between mounting flange 40 and resilient arm 42, may be and preferably is radially-inwardly-extending internal rib or dimples 44, as best seen in FIGS. 3 and 4. The outer edge 46 of resilient arm 42 is generally circular and flared slightly radially-outwardly for ease of installation of the mounting device 34 around the base of inflator 12. The resilient arm 42 with flared outer end 46 forms a generally circular opening which is adapted to receive, engage and hold the inflator housing 26. The inside diameter of resilient arm 42 is slightly smaller than the outside diameter of inflator housing 26 so that a press fit is formed between resilient arm 42 and housing 26. The radially-outwardly flared end 46 of resilient arm 42 provides a lead-in for the press fit of the resilient arm 42 to the inflator housing 26. The presence of internal rib or discrete dimples 44 provides an additional mounting and inflator securing means. The rib or dimples 44 are appropriately located so that after installation of the inflator 12 in reaction can cavity 14 the rib or discrete dimples 44 are positioned adjacent or abutting the inflator base 30 to prevent any significant rearward axial movement of inflator 12. If desired, relief slots 60 may be placed in resilient arm 42 to modify the binding force of resilient arm 42 on inflator housing 26.

Mounting means 34 is placed in a suitable complimentary access opening in end wall 20 of reaction can 10 such that mounting flange 40 abuts against end wall 20. Mounting flange 40 is secured to end wall 20 by any suitable securing means 48, such as for example, with bolts, screws or by welding.

Although the mounting device 34 is being described as a discretely formed element that is inserted into the access opening in end wall 20 and suitably secured to said end wall 20, it will be appreciated that mounting device 34 can be formed as an integral, i.e. unitary, part of the end wall 20 of the reaction can 10.

At the other end wall 22 of the reaction can 10 a cup mounting means 50 may be employed for longitudinal centering and primary retention of the inflator 12 in the reaction can 10. Cup mounting means 52 is placed in an access opening in end wall 22, with radially extending collar 52 of said cup means 50 abutting the outer surface of end wall 22. Cup means 50 has a flat bottom 54 with a shaped hole 56 thereto adapted to receive the threaded stud 32 and any index key on the threaded stud end of the inflator 12. A nut 58 is threaded onto the stud 32 thereby clamping the cup bottom 54 between the nut 58 and the end of the inflator 12. An indexing key (not shown) may be provided on the threaded stud end of the inflator to provide proper orientation of a plurality of nozzles (not shown) in the cylindrical outer housing 26 of the inflator 12 to permit proper inflation of a folded airbag (not shown) in the reaction can. Such indexing means are known in the art for achieving such proper orientation of the nozzles.

Although a mounting cup 50 may be employed at end wall 22 such a cup is not required. Rather, threaded stud 32 and any index key may simply be placed into complimentary shaped openings in end wall 22 and nut 58 is then threaded onto the stud 32 thereby clamping end wall 22 between nut 58 and the end of inflator 12. As with mounting means 34 it will be appreciated that cup means 50 may be a discretely formed element or may be formed as an integral, i.e. unitary, part of end wall 22.

On installation, the inflator 12 is placed in the reaction can cavity 14 and fastened to the stud end cup 50 with a nut 58. This mounting constitutes the primary retention method for inflator 12. The mounting device 34 is then pressed on to the flangeless base 30 of inflator 12 until the outboard mounting flange 40 seats against the reaction can 10 where fasteners 48 are installed. The friction fit of resilient arm 42 of the mounting device 34 on the inflator base 30 produces radially-inwardly biased compression force which provides rattle and squeak protection along with centering of the inflator and prevents gas loss sealing. The adjacent internal intermediate rib or dimples 44 provide tertiary retention by eliminating the possibility of inflator translation, should the primary retainer stud 32 and/or the nut 58 fail.

Where mounting device 34 is formed as an integral part of reaction can end wall 20, the installation procedure is as follows. The inflator 12 is placed in the reaction can cavity 14, with end wall 20 not yet in place, and is fastened to stud end cups 50 by means of nut 58. This mounting again constitutes the primary retention method for inflator 12. Then end wall 20, with mounting device 34 integral therewith, is put into place on the reaction can by inserting the inflator base 30 into resilient arm 42 by entry into the opening provided by flared end 46 of arm 42, pressing the mounting device on to inflator 12 until end wall 20 is positioned for suitable attachment to reaction can 10.

A further embodiment of a mounting device 34 for use in accordance with this invention is illustrated in FIG. 5. In said embodiment mounting device 34 includes circular sidewall 38 terminating at a first end in radially-outwardly directed mounting flange 40 having sockets 62 for receiving fastening means 48 such as bolts, screws or the like (not shown) for securing the mounting means to an end wall of a reaction can. At the other end circular sidewall 38 terminates in a resilient arm 42 the end thereof 46 being flared radially-outwardly intermediate the mounting flange 40 and resilient arm 42 circular sidewall 38 has a radially-inwardly-extending internal rib 44. When mounting device 34 of FIG. 5 is employed in an end wall of a reaction can, resilient arm 42 engages and holds an inflator housing, as described hereinbefore, by biased radially-inwardly compression force and internal rim 44 abuts against base 30 of an inflator to prevent any significant rearward axial movement of the inflator due to failure of threaded stud 32 or mounting cup 50.

The radial tensile strength or radially compressive forces of the resilient arm 42 when the inflator is inserted therethrough, in the manner described hereinbefore, provides a reliable and long-lasting method of retaining a flangeless based inflator in a reaction can when the inflator is shorter in length than the length of the reaction can. In addition, the essentially 360° contact between the resilient arm 42 against inflator base 30 provides a seal against gross gas escape at deployment. A further significant advantage of the mounting means of this invention resides in the fact that the circular cylindrical configuration of the mounting device 34 is cost effective because it lends itself to low cost fabrication methods.

Accordingly, the mounting structure of the present invention provides an excellent longitudinal centering and retaining device where the inflator has a flangeless base and the inflator has a dimension that is shorter than that of the reaction can into which it is to be installed. Radial compressive forces of the resilient arm of the mounting device on the inflator base provides a reliable and long-lasting method of retaining the inflator in an essentially squeak- and rattle-proof arrangement. Also, the contact between the mounting device 34 and the inflator base 30 is such that, in addition to the centering and retaining qualities, the contact provides a seal against gas escape at deployment of the airbag of the airbag restraint assembly. The mounting structure 34, as is stud cup 50, is simple to install and easy to fabricate on high speed tooling. Also, mounting device 34 and cup 50 are interchangeable on various inflator/reaction can module configurations and thus can save tool requirements and assembly time on the assembly lines.

Additionally, the recessed cup-like structure of mounting device 34 provides for wire protection around the flangeless base end, i.e. squib end, of the inflator. Also, cup 50 permits stud 32 and nut 58 to be recessed from end wall 22 at the other end of inflator 12.

Since other changes and modifications to fit particular operating requirements and environments will be apparent to those skilled in the art, the invention is not considered limited to the examples chosen for purposes of illustration and includes all changes and modifications which do not constitute a departure from the true spirit and scope of this invention as claimed in the following claims and equivalents thereto.

We claim:

1. An airbag restraint inflator assembly comprising:
   a reaction can having a mounting means providing an opening in a first end wall thereof, said opening adapted to receive and position an inflator within a cavity of said reaction can;
   an inflator, shorter in dimension than the reaction can, and having a generally cylindrical housing with a flangeless base on a first end thereof;
   said reaction can mounting means being a generally open, right circular cylindrical shaped tube formed by a circular sidewall, said sidewall terminating at one end thereof with a radially extending mounting flange having an outer diameter greater than a diameter of said first end wall opening and terminating in a resilient arm on the other end of said sidewall;
   said mounting means being located in said reaction can first end wall with said resilient arm engaging and holding the inflator housing by biased radial compression force.

2. The airbag restraint inflator assembly as claimed in claim 1 wherein said inflator is terminated on a second and opposite end thereof in a threaded stud protruding through a shaped hole in a second and opposite end wall of said reaction can, said shaped hole adapted to receive said threaded stud, and a nut mounted on said stud for mounting and securing said second end of said inflator in said reaction can.

3. The airbag restraint inflator assembly as claimed in claim 2 having a mounting cup positioned in an access opening in said second end wall of said reaction can, said mounting cup having a flat bottom with a shaped opening therein for receiving the threaded stud and an index key on the second end of said inflator, said flat bottom of said mounting cup being clamped between the nut on the threaded stud and the second end of the inflator for centering and retention of the inflator in the cavity of the reaction can.

4. The airbag restraint inflator assembly as claimed in claim 1 wherein:
   said mounting means further comprises a circumferential rib or discrete dimples extending radially-inwardly from said sidewall intermediate said mounting flange and said resilient arm, and said resilient arm terminates in an end flared radially-outwardly;
   said mounting means being mounted in said reaction can first end wall with said resilient arm engaging and holding the inflator housing by biased radial compression force in a manner whereby the base of said first end of said inflator is adjacent the circumferential rib or dimples, thereby providing an essentially squeak- and rattle-free retention of said flangeless based inflator in said reaction can.

5. The airbag restraint inflator assembly as claimed in claim 4 wherein said inflator is terminated on a second and opposite end thereof in a threaded stud protruding through a shaped hole in a second and opposite end wall of said reaction can, said shaped hole adapted to receive said threaded stud, and a nut mounted on said stud for mounting and securing said second end of said inflator in said reaction can.

6. The airbag restraint inflator assembly as claimed in claim 5 having a mounting cup positioned in an access opening in said second end wall of said reaction can, said mounting cup having a flat bottom with a shaped opening therein for receiving the threaded stud and an index key on the second end of said inflator, said flat bottom of said mounting cup being clamped between the nut on the threaded stud and the second end of the inflator for centering and retention of the inflator in the cavity of the reaction can.

7. An airbag restraint inflator assembly comprising:
   a reaction can having an access opening in a first end wall of said reaction can, said access opening adapted to receive and position mounting means for retaining an inflator within a cavity of said reaction can;
   an inflator, shorter in dimension than the reaction can, having a generally cylindrical housing with a flangeless base on a first end thereof and a threaded stud and index key on the second end thereof;
   said mounting means positioned in said access opening of said reaction can, said mounting means having a generally open, right circular cylindrical shape to be formed by a circular sidewall, said sidewall terminating at one end thereof with a radially extending mounting flange having an outer diameter greater than a diameter of the access opening in said first end wall, a resilient arm terminating in an end flared radially-outwardly on the other end of said sidewall, a circumferential rib or discrete dimples extending radially-inwardly from said sidewall intermediate said mounting flange and said resilient arm;

said mounting means being mounted in said access opening in the first end wall of said reaction can with said resilient arm frictionally engaging and holding the inflator housing by biased radial compressive force in a manner whereby the flangeless base of said first end of said inflator abuts the intermediate rib or discrete dimples, thereby providing an essentially squeak- and rattle-free retention of said flangeless based inflator in said reaction can.

8. A reaction can adapted to mount an inflator of the type comprising a generally cylindrical housing having a flangeless base at a first end thereof and a threaded stud at a second end thereof, the reaction can comprising:

first and second end walls and first and second sidewalls defining a cavity adapted to receive an inflator;

said first end wall having inflator mounting means provided therein, said inflator mounting means including a right circular cylindrical shaped tube formed by a circular sidewall, said circular sidewall extending from said first end wall into said cavity and terminating in a resilient arm sized to engage and hold the flangeless based first end of an inflator in said cavity by biased radial compression force; and support means in said second end wall for securing a second end of said inflator.

9. A reaction can as claimed in claim 8 wherein said mounting means further comprises a circumferential rib or discrete dimples extending radially-inwardly from said sidewall intermediate the first end wall of the reaction can and said resilient arm, said mounting means being mounted in said reaction can first end wall with said resilient arm adapted to engage and hold the inflator housing by biased radial compression force in a manner whereby the flangeless base of said first end of said inflator is adjacent the circumferential rib or discrete dimples, thereby providing an essentially squeak- and rattle-free retention of said flangeless based inflator in said reaction can.

10. The reaction can as claimed in claim 9 wherein said support means in said second end wall comprises a mounting cup positioned at an access opening in said second end wall, said mounting cup having a flat bottom with a shaped opening therein for receiving a threaded stud and index key on the second end of said inflator whereby the flat bottom of said mounting cup is adapted to be clamped between a nut threaded on the threaded stud and the other end of the inflator for centering and retention of the inflator in the cavity of said reaction can.

* * * * *